US009652744B2

(12) United States Patent
Eberlein et al.

(10) Patent No.: US 9,652,744 B2
(45) Date of Patent: May 16, 2017

(54) SMART USER INTERFACE ADAPTATION IN ON-DEMAND BUSINESS APPLICATIONS (71) Applicants: Peter Eberlein, Malsch (DE); Bare Said, Sankt Leon-Rot (DE)

(72) Inventors: Peter Eberlein, Malsch (DE); Bare Said, Sankt Leon-Rot (DE)

(73) Assignee: SAP SE, Walldorf (DE)

( * ) Notice: Subject to any disclaimer, the term of this patent is extended or adjusted under 35 U.S.C. 154(b) by 236 days.

(21) Appl. No.: 13/710,353

(22) Filed: Dec. 10, 2012

(65) Prior Publication Data

US 2014/0164933 A1 Jun. 12, 2014

(51) Int. Cl.
G06F 3/048 (2013.01)
G06Q 10/10 (2012.01)
G06Q 10/04 (2012.01)

(52) U.S. Cl.
CPC ............ G06Q 10/103 (2013.01); G06Q 10/04 (2013.01)

(58) Field of Classification Search
CPC ................. G06F 9/4443; G06F 3/0481; G06F 17/30867; G06F 17/30905; G06F 3/048; H04L 41/22; G06Q 10/10; G06Q 10/06
USPC ....... 715/771, 825, 744; 705/7.26, 7.13, 301
See application file for complete search history.

(56) References Cited

U.S. PATENT DOCUMENTS

| 2005/0054381 | A1* | 3/2005 | Lee ........................ G06F 3/011 455/557 |
| 2006/0241954 | A1* | 10/2006 | Jeng et al. ........................ 705/1 |
| 2007/0300185 | A1* | 12/2007 | Macbeth .............. G06F 9/4443 715/825 |
| 2010/0131482 | A1* | 5/2010 | Linthicum .......... G06F 19/3406 707/706 |
| 2010/0223212 | A1* | 9/2010 | Manolescu ............ G06Q 10/06 706/12 |
| 2010/0223557 | A1* | 9/2010 | Kenney et al. ............... 715/736 |
| 2013/0145299 | A1* | 6/2013 | Steimle ................... G06F 3/048 715/771 |
| 2014/0006078 | A1* | 1/2014 | McGauley ............. G06Q 10/06 705/7.15 |

* cited by examiner

Primary Examiner — Amy Ng
Assistant Examiner — Sang H Kim
(74) Attorney, Agent, or Firm — Mintz Levin Cohn Ferris Glovsky and Popeo, P.C.

(57) ABSTRACT

In one aspect, there is provided a method. The method may include monitoring a process including a plurality of user interfaces, at least one of the user interfaces representing a notification of a task to be completed and at least another user interface representing information associated with an action corresponding to the notification; determining whether at least a portion of the process is a candidate for adaptation; and adapting the process by combining a first portion of the at least one of the user interface representing the notification of the task and a second portion of the at least other user interface representing the information associated with the action. Related systems, methods, and articles of manufacture are also disclosed.

16 Claims, 9 Drawing Sheets

SMART USER INTERFACE ADAPTATION IN ON-DEMAND BUSINESS APPLICATIONS

TECHNICAL FIELD

The subject matter described herein relates generally to data processing.

BACKGROUND

The inherent complexity of business scenarios, which can include one or more business processes, and their implementation in business software solutions, enterprise resource planning (ERP) systems, and the like can present substantial challenges to users and can be a serious obstacle to widespread operative use of process and scenario models in the software landscape. Indeed, these complex business processes may include dozens, if not hundreds or more, steps, making it difficult for the end-user and the enterprise to manage.

SUMMARY

In one aspect, there is provided a method. The method may include monitoring a process including a plurality of user interfaces, at least one of the user interfaces representing a notification of a task to be completed and at least another user interface representing information associated with an action corresponding to the notification; determining whether at least a portion of the process is a candidate for adaptation; and adapting the process by combining a first portion of the at least one of the user interface representing the notification of the task and a second portion of the at least other user interface representing the information associated with the action.

In some variations, one or more of the following features can optionally be included in any feasible combination. The monitoring may include monitoring the navigation between the at least one user interface and the other user interface. The monitoring may include comparing a first object type associated with the notification of the task with a second object type associated with the action to determine whether a match exists representative of the candidate for adaptation. The combining may include combining the first portion and the second portion, when the match exists. A prompt may be provided at a user interface to obtain consent to the combining. The monitoring may include monitoring an application programming interface at each of the at least one user interface and the other user interface to enable the determining. An adaptor may be configured at the application server of a multi-tenant system, and the adaptor may be configured to perform at least one of the monitoring, the determining, and the adapting.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The on-demand software consumption model does not typically allow for lengthy implementations including business applications customized to company-specific business processes. This can lead to software that provides disjointed functional components, rather than a coherent workflow of functional components. For example, when a manager receives a leave request from a team member, the manager may decide whether to approve the request based on factors, such as the availability of other team members during the timeframe associated with the leave request, workload, deadlines, and the like. In this example, the manager may need to navigate from an approval task inbox containing the leave request to an information report showing the availability of other team members during the timeframe of the leave, team member workloads, and/or team deadlines. And, based on the review of the report, the manager may return to the approval inbox to approve or deny the leave request. The subject matter disclosed herein relates to programmatically adapting the user interface in order to combine the information needed by the end-user, which may in some implementations reduce the so-called back-and-forth navigation noted in the previous example.

In some example implementations, there is provided a user interface programmatically adapted in a so-called smart way. "Smart" in this context refers to a business application that monitors how one or more tasks of a workflow are performed by a user, so that when a pattern is detected, the user interface can be programmatically adapted to perform one or more tasks, which may in some implementations reduce the back-and-forth navigation noted above.

Figure 1:
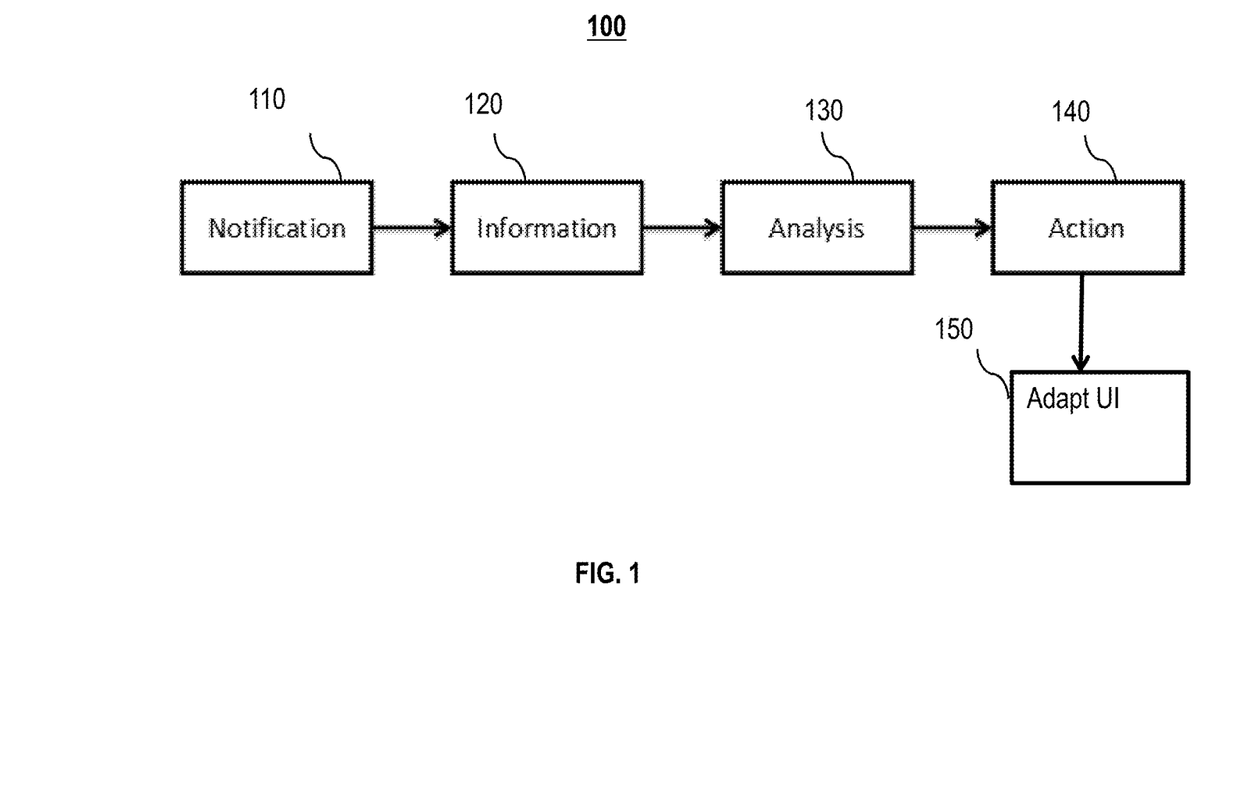
FIG. 1 shows an example process, in accordance with some example implementations.

FIG. 1 depicts an example process 100 for adapting a user interface in a smart way.

At 110, a user interface may receive a notification. For example, a user interaction with a business system may be triggered by an initial notification from the business system. This notification may prompt an action, and the notification may be delivered to a user in a variety of ways, such as via an inbox and/or a business object specific query, such as a view. In the case of an inbox notification, the inbox may provide an overview of the notification as well as other pending notifications. These inbox notifications may also include a status, such as for example an indication that a task is pending for a leave request approval. In the case of the business object specific query, a user interface may include a query listing of one or more pending tasks, such as for example a leave request approval.

Figure 2:
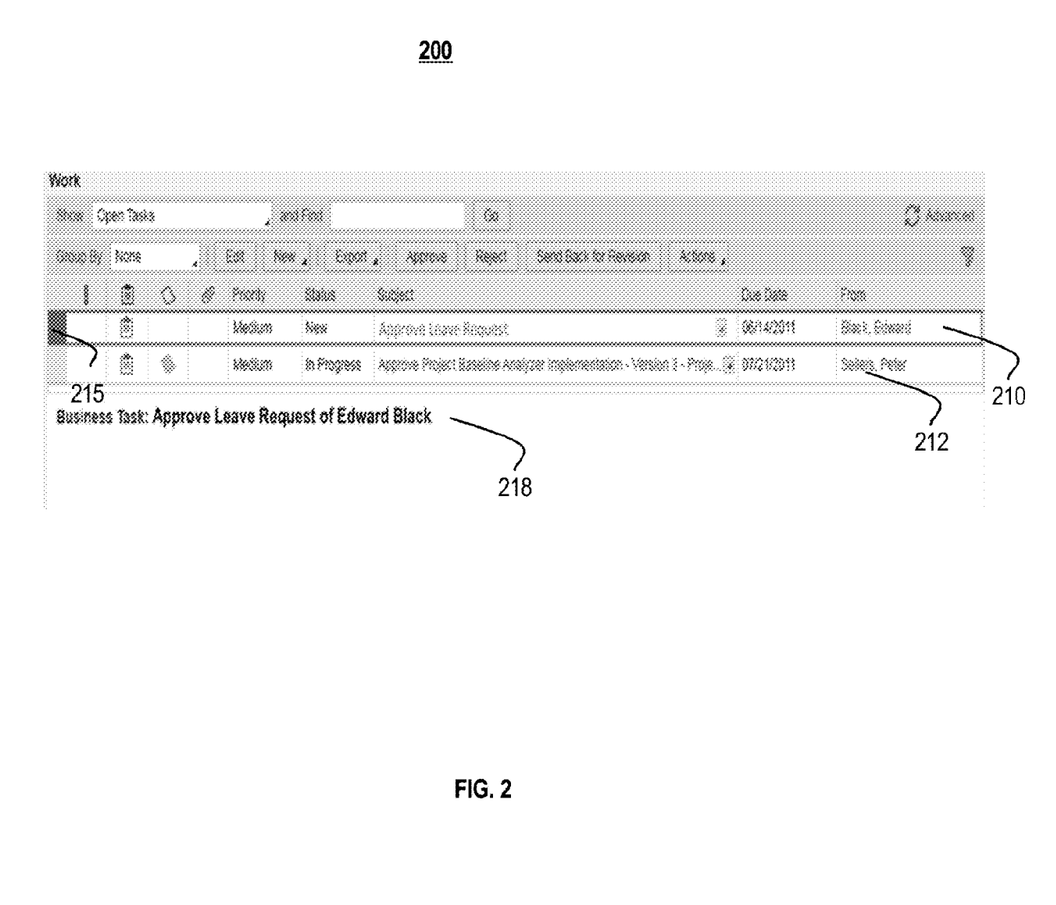
FIG. 2 shows an example of a user interface including a notification.

FIG. 2 depicts an example of an inbox for receiving notifications to perform an action. Referring to FIG. 2, the inbox includes two notifications 210 and 212. The first notification 210 includes status information, such as for example priority (e.g., low, medium, high, and the like), status (e.g., new, completed, in-progress, and the like), a subject, a due date, and the identity of the entity sending the notification. In the example of FIG. 2, the notification 210 has been selected as indicated by the highlighting 215 and the summary information 218 for notification 210.

Figure 3:
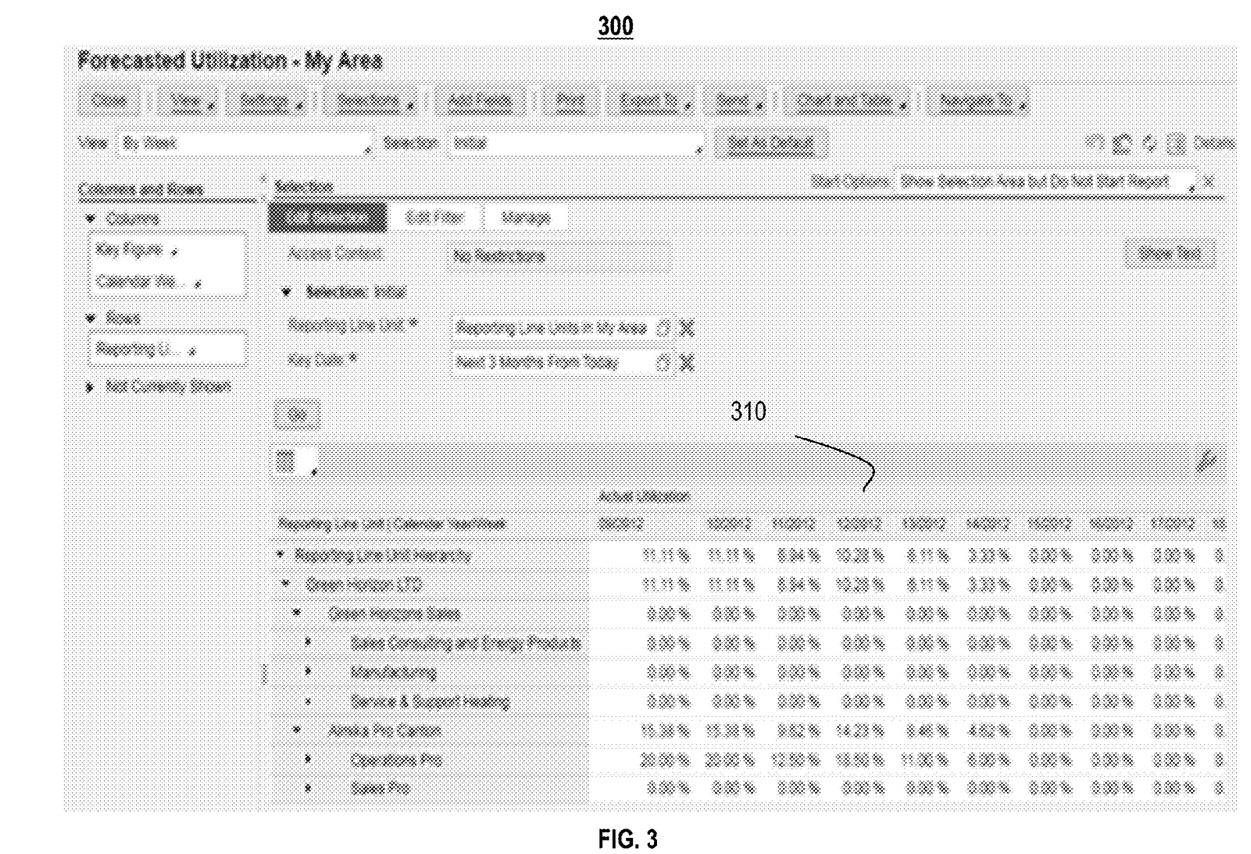
FIG. 3 shows an example of a user interface including information which may be used to perform an action corresponding to the notification.

Referring again to FIG. 1 at 120, information, such as a report, may be accessed in order to act on the notification. This information may include data contained in a business object that triggered the notification. For example, a leave request business object may include the requestor and the timeframe of the leave but it may not include data about the work utilization of the team or the availability of other personnel during the timeframe associated with the leave. As such, a user may then need to access this information in order to determine whether to approve the leave request. FIG. 3 depicts an example of a report 300 including utilization information 310. The utilization information may allow the user to determine whether to approve the leave.

Referring again to FIG. 1 at 130, an analysis may be performed. For example, before a use takes an action an analysis may be performed of the information provided at 120. Returning to the leave request example, a user-manager may compare a utilization percentage against a team size to determine if the work scheduled can be processed by the remaining team members if one person takes leave.

At 140, an action may be taken. For example, if the utilization forecast is low enough to not cause any work delay, the leave request can be approved via the user interface 200.

In some example implementations, a smart user interface adaptor may monitor the tasks 110-140 to determine whether a user interface can be adapted in order to reduce the back-and-forth navigation between user interfaces, such as navigating from 200 to 300 and then back to 200. For example, smart user interface adaptor may monitor a user's navigation between views 200, 300, and back to 200 and send a message to the user asking whether views 200 and 300 can be combined into an adapted user interface containing the information of views 200 and 300, although the adaptation can also be performed automatically as well without user consent.

The following illustrates an example scenario of how smart user adaption may occur. For example, when a user navigates from a user interface containing a notification ("notification user interface") to an another user interface providing information ("information user interface"), the smart user interface adaptor may monitor the navigation and then compare the object types of the item the user processed in the notification user interface and the object type in the information user interface. If there is a match, the smart user interface adaptor may detect a possible adaption scenario exists. Referring to the previous example, the object type in the notification interface 200 is "employee," and in object type in the information interface 300 is "department." In this example, the smart user interface adaptor may detect that "employee" has a relation to "department" (for example, a business object associated with employee may have a link to department), so there is a match of object types. After the type match, the smart user interface adaptor may also detect an instance match on "department" by determining the specific user interfaces (or portions thereof) the user accesses to obtain information in connection with the department. The detected instance match may also be incorporated into the user interface adaption.

Figure 4:
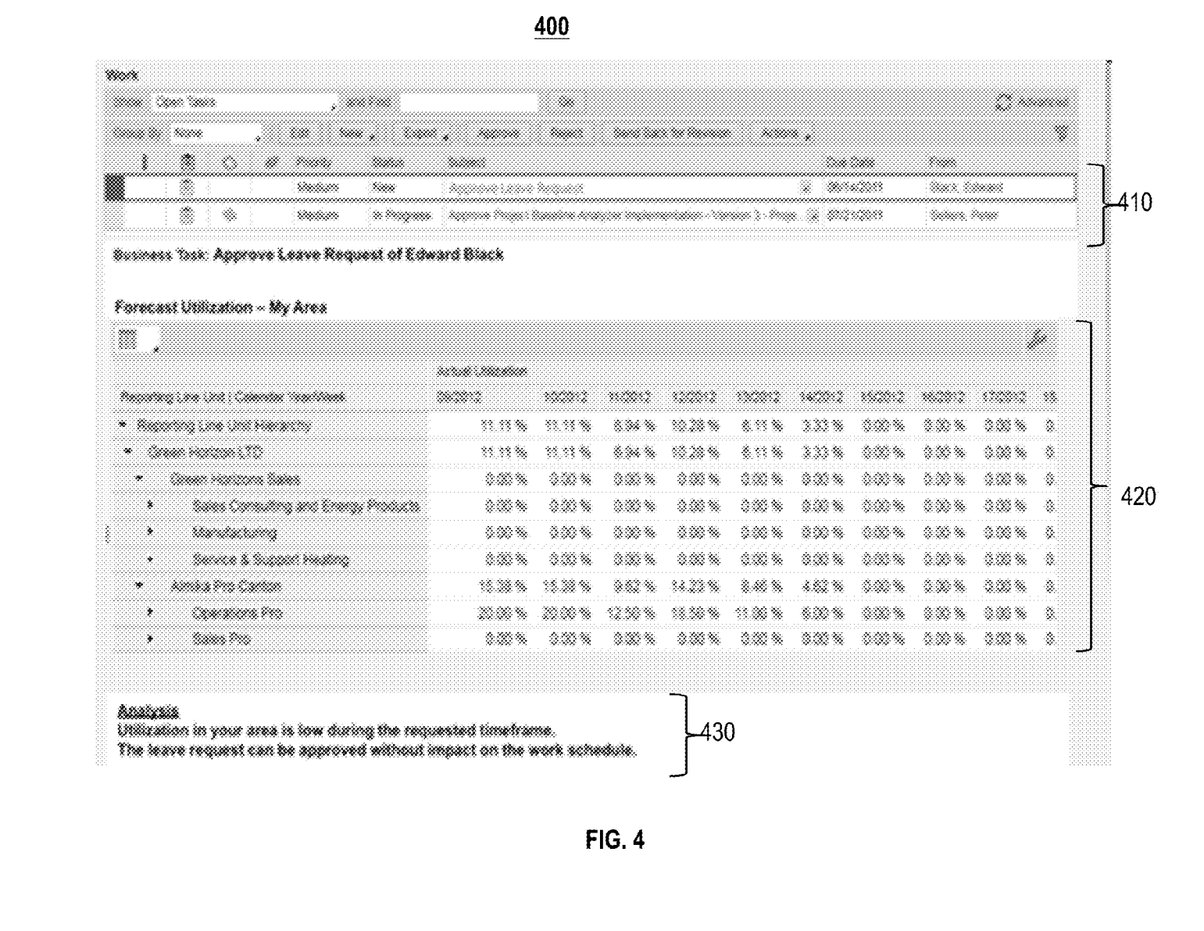
FIG. 4 shows an example of an adapted user interface combining the user interface including the notification and the user interface including the information, in accordance with some example implementations.

FIG. 4 depicts an example of a smartly adapted user interface 400 combining the inbox notification 410 and the information 420, which may, in some implementations, reduce the back-and-forth navigation between views 200 and 300 as noted in the example above.

Referring again to FIG. 1, after monitoring a user processing several leave requests, the smart user interface adaptor may determine that the utilization forecast report 300 for the manager's area provides the information needed to make a decision on the leave request at 200. The smart user interface adaptor may also detect that the query parameter used to execute this report is the timeframe of the leave request. As such, after one or more iterations of the process 110-140, the smart user interface adaptor may present user interface 400, when a subsequent notification is received. For example, once the smart user interface adaptor monitors and adapts the user interface, a subsequent notice, such as a leave request, received in the manager's inbox causes FIG. 4 to be generated and presented so that the inbox information 410 and the utilization forecast report 420 are automatically presented (and the utilization forecast may be generated based on a query parameter associated with the timeframe of the leave request).

Although the example above refers to combining two views associated with leave request processing and a utilization reports, these are merely examples as other types of adaptations may be performed as well. Moreover, although the example above refers to combining two views, other quantities of views may be combined as well. Furthermore, the smart user interface adaptor may adapt a user interface in other ways. For example, the smart user interface adaptor may monitor queries, data entry, preferences and the like and adapt the user interface accordingly.

Figure 5:
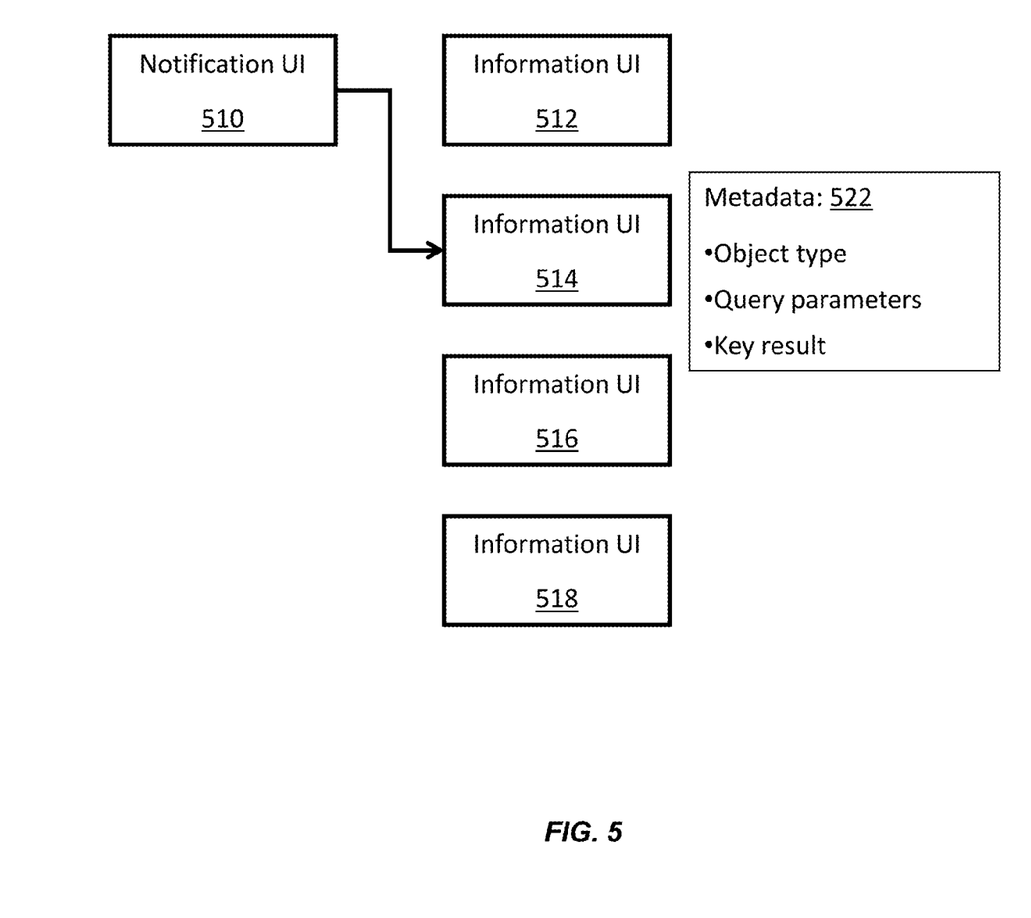
FIG. 5 depicts an example of modeled user interfaces, in accordance with some example implementations.

The smart user interface adaptor may be configured monitor and adapt modeled user interfaces with well-defined application programming interfaces (APIs) to enable passing query parameters and retrieving data. FIG. 5 depicts examples of modeled user interfaces 510-518, and these modeled user interfaces may be configured to allow registration of relevant metadata 522, such as for example business object type, query parameters, key results, and the like. In the example of FIG. 5, smart user interface adaptor may monitor the registered metadata, APIs, and the like to detect whether a user interface should be adapted.

Returning to the previous example, when a user navigates from a notification user interface 510 to an information user interface 514, the smart user interface adaptor may compare the object types of the item the user processed in the notification user interface 510 and the modeled object type in the information user interface 514. If there is a match, there is a candidate opportunity for the smart user interface adaptor to adapt a user interface. And if the same navigation occurs repeatedly for this object type to this specific information user interface, smart user interface adaptor may embed the information user interface in the notification user interface for every item of this object type. The smart user interface adaptor may also compare query parameters entered in the information user interface with fields in the object processed in the notification user interface. If the smart user interface adaptor finds matches, the smart user interface adaptor may automatically populate the query parameters with data from the currently processed object instance when embedding the information user interface.

To suggest a recommended action, the smart user interface adaptor may also analyze the key result returned the information interface. For the utilization forecast example, this key result may represent a utilization of the selected team during the selected timeframe. If smart user interface adaptor detects that key results in a certain value range correlate with another action, the smart user interface adaptor may recommend a proposed action to the user. For example, the smart user interface adaptor may also present on user interface 400 a recommendation, such as approve or reject as shown at 430. And, this recommendation may be based on key results data and monitoring of prior rejections and approval (e.g., utilization less than 60%, propose via user interface an approval of the request, but utilization greater than 60% indicate a likely rejection of the request).

Figure 6:
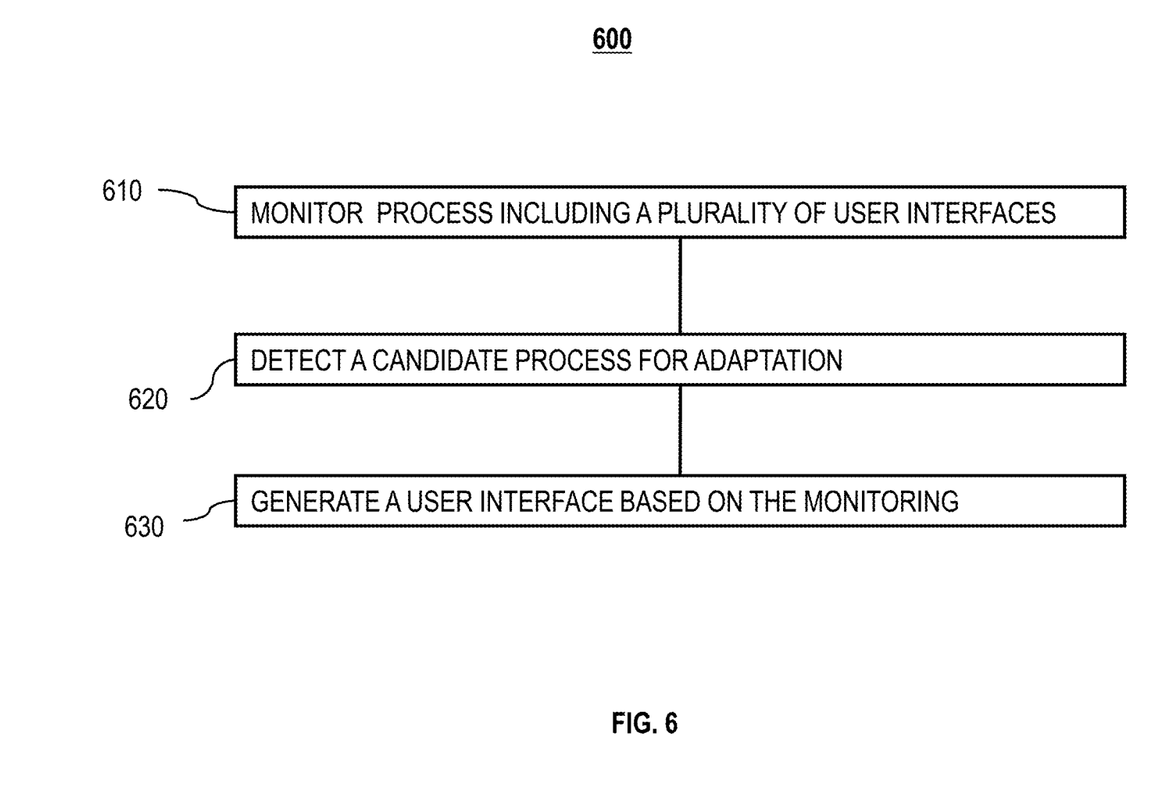
FIG. 6 depicts another process, in accordance with some example implementations.

FIG. 6 shows a process flow chart 600 for providing one or more views to guide execution of a business process.

At 610, a process including a plurality of user interfaces may be monitored. For example, the smart user interface adaptor may monitor how a user performs tasks in a workflow and, in particular, the user interfaces and/or key results used to make a decision on an action. At 620, a candidate process may be detected as a candidate for adaptation. For example, if a series of tasks including user interfaces are repeatedly used in a back-and-forth manner before making a decision on an action, the smart user interface adaptor may propose an adaptation to combine user interfaces (or portions therein) to form an adapted user interface. The smart user interface adaptor may also incorporate key results as well into the adapted user interface. At 630, a user interface may be generated to handle the detected process based on the monitoring. For example, the adapted user interface as depicted at FIG. 4 may be presented when a subsequent notice is presented.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible.

Figure 7:
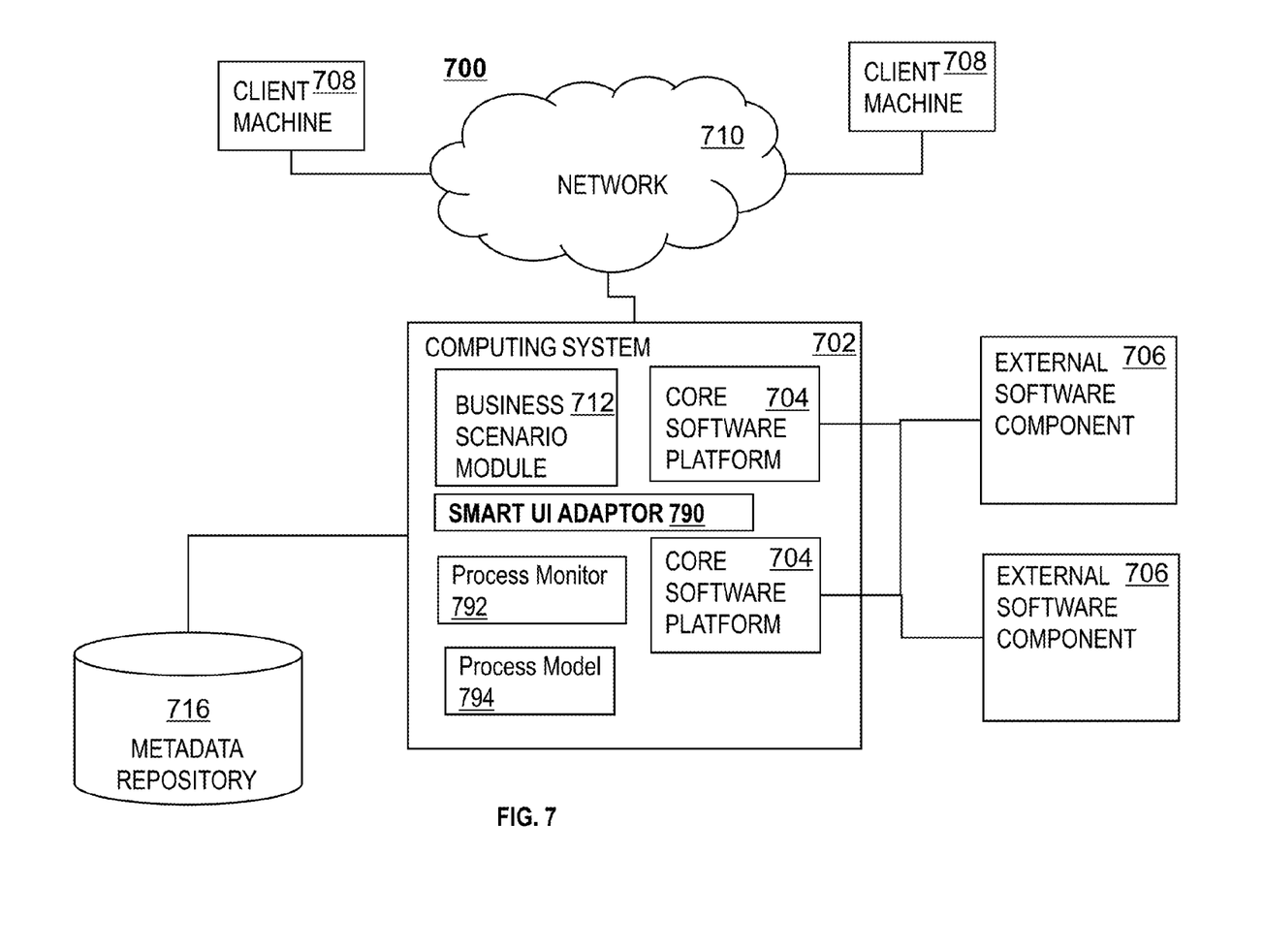
FIG. 7 is a diagram illustrating aspects of a system showing features consistent with implementations of the current subject matter.

FIG. 7 shows a diagram of a system consistent with such an implementation. A computing system 700 can include one or more core software platform modules 704 providing one or more features of the ERP system. The computing system can also aggregate or otherwise provide a gateway via which users can access functionality provided by one or more external software components 706, which can optionally be available from a service provider external to the core software platform modules 704. The computing system 702 may include a process monitor 792 to monitor a process, such as a workflow, and a process model 794 to allow guided execution of business processes being executed by system 700. The computing system 702 may also include a smart user interface adaptor 790 configured to monitor processes, detect candidate processes for adaptation, generate adapted user interfaces, and other operations as disclosed herein. Although FIG. 7 depicts smart user interface adaptor 790 at computing system 702, smart user interface adaptor 790 may be at other locations as well.

Client machines 708 can access the computing system, either via a direct connection, a local terminal, or over a network 710 (e.g. a local area network, a wide area network, a wireless network, the Internet, or the like). A business process scenario module 712 can be hosted on the computing system 702 or alternatively, on an external system accessible over a network connection. The business scenario module 712 can optionally include one or more discrete software and/or hardware modules that perform operations such as those described herein. The business scenario module 712 can access one or more metadata repositories 716 and/or other data repositories that can store the definition of business process as well as data relating to concrete instances of the data objects (e.g. business objects) that are relevant to a specific instance of the business process. In some examples, the definition can optionally be stored as a business object. In some implementations, the business object can include a template definition of a standard business process. The template definition that can optionally be modified via one or more extensions that are stored in the one or more metadata repositories 716.

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services of an ERP system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 8:
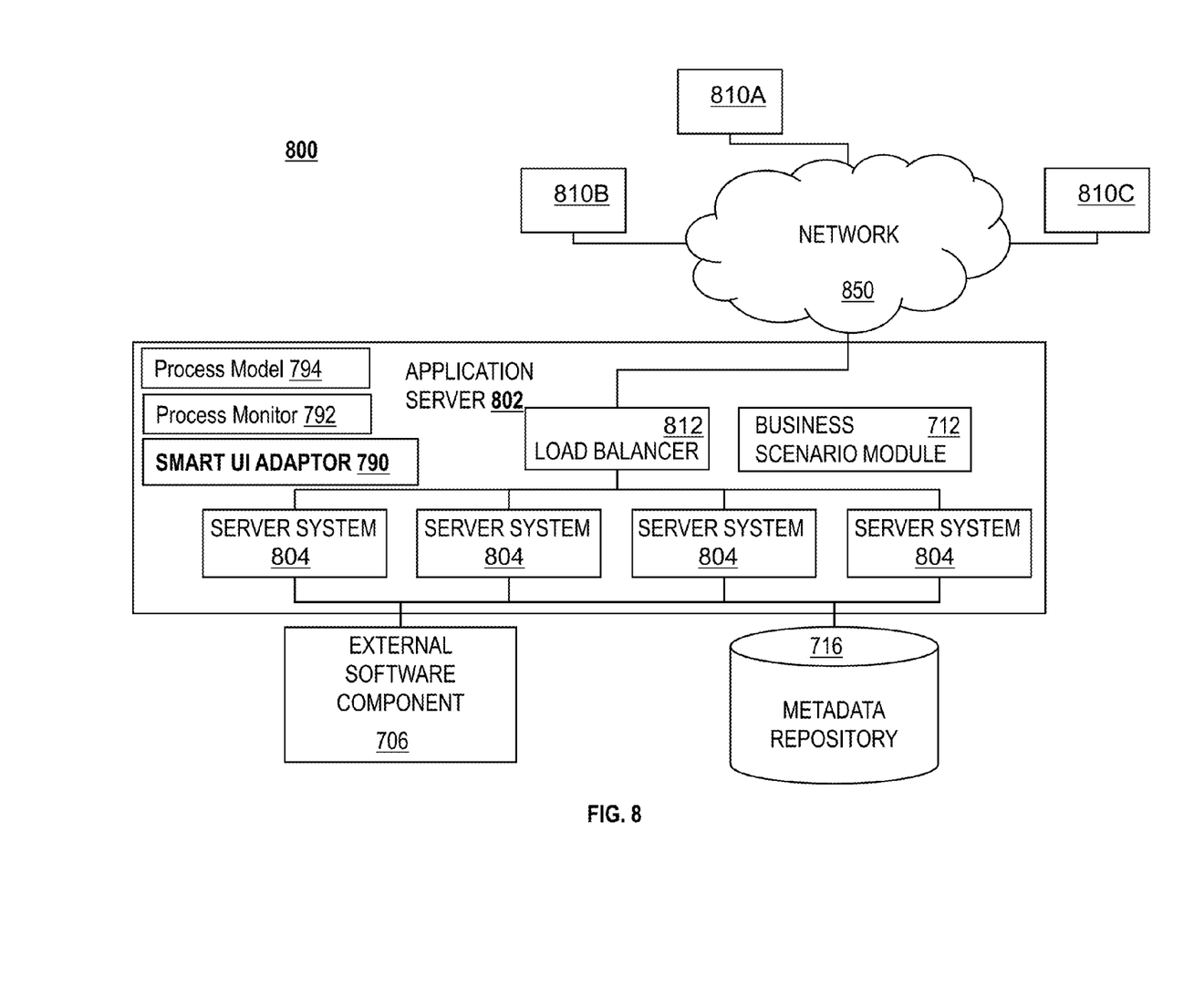
FIG. 8 is a diagram illustrating aspects of another system showing features consistent with implementations of the current subject matter.

FIG. 8 shows a block diagram of a multi-tenant implementation of a software delivery architecture 800 that includes an application server 802, which can in some implementations include multiple server systems 804 that are accessible over a network 850 from client machines operated by users at each of multiple organizations 810A-810C (referred to herein as "tenants" of a multi-tenant system) supported by a single software delivery architecture 800. FIG. 8 also includes the smart user interface adaptor 790, the process monitor 792, and the process model 794. Although FIG. 8 depicts smart user interface adaptor 790 at application server 804, smart user interface adaptor 790 may be at other locations as well.

For a system in which the application server 802 includes multiple server systems 604, the application server can include a load balancer 812 to distribute requests and actions from users at the one or more organizations 810A-810C to the one or more server systems 804. Instances of the core software platform 804 (not shown in FIG. 8) can be executed in a distributed manner across the server systems 804. A user can access the software delivery architecture across the network using a thin client, such as for example a web browser or the like, or other portal software running on a client machine. The application server 802 can access data and data objects stored in one or more data repositories 716. The application server 802 can also serve as a middleware component via which access is provided to one or more external software components 706 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 802 that includes multiple server systems 804 that handle processing loads distributed by a load balancer 812. Potential benefits from such an arrangement can include, but are not limited to, high and reliably continuous application server availability and minimization of unplanned downtime, phased updating of the multiple server systems 804 to permit continuous availability (one server system 804 can be taken offline while the other systems continue to provide services via the load balancer 812), scalability via addition or removal of a server system 804 that is accessed via the load balancer 812, and de-coupled lifecycle processes (such as for example system maintenance, software upgrades, etc.) that enable updating of the core software independently of tenant-specific customizations implemented by individual tenants.

The metadata repository 716 can store a business object that represents a template definition of a standard business process. The repository may also include data associated with the process models disclosed herein. Further, each individual tenant 810A-810C can customize that standard template according to the individual business process features specific to business of the organization to which that tenant is assigned. Customizations can be stored as extensions in the metadata repository.

Figure 9:
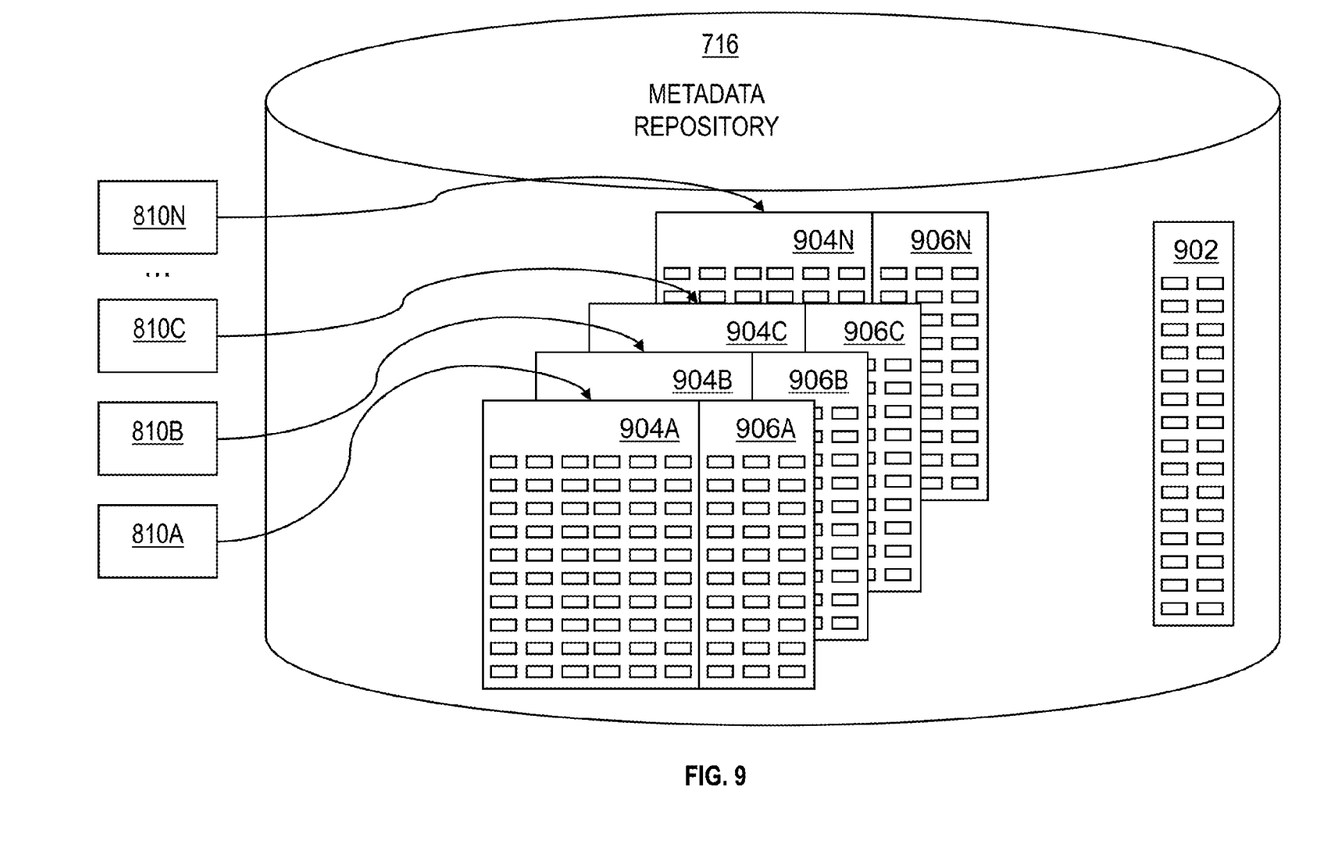
FIG. 9 is a diagram illustrating a data repository showing features consistent with implementations of the current subject matter.

To provide for customization of the business process for each of multiple organizations supported by a single software delivery architecture 800, the data and data objects stored in the metadata repository 716 and/or other data repositories that are accessed by the application server 802 can include three types of content as shown in FIG. 9: core software platform content 902 (e.g. a standard definition of a business process), system content 904 and tenant content 906. Core software platform content 902 includes content that represents core functionality and is not modifiable by a tenant. System content 904 can in some examples be created by the runtime of the core software platform and can include core data objects that store concrete data associated with specific instances of a given business process and that are modifiable with data provided by each tenant. The data retained in these data objects are tenant-specific: for example, each tenant 810A-810N can store information about its own inventory, sales order, etc. Tenant content 906A-906N includes data objects or extensions to other data objects that are customized for one specific tenant 810A-810N to reflect business processes and data that are specific to that specific tenant and are accessible only to authorized users at the corresponding tenant. Such data objects can include a key field (for example "client" in the case of inventory tracking) as well as one or more of master data, business configuration information, transaction data, or the like. For example, tenant content 906 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 902 and system content 904 and tenant content 906 of a specific tenant are accessed to provide the business process definition and/or the status information relating to a specific instance of the business process according to customizations and business data of that tenant such that each tenant is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer-readable medium including code that, when executed by at least one programmable processor, cause the at least one programmable processor to perform operations comprising:

monitoring a plurality of user interfaces for a process, wherein a first user interface represents a notification of a workflow task to be completed and a second user interface represents information associated with an action corresponding to the notification, and wherein the monitoring includes monitoring at least a navigation between a portion of the first user interface and a portion of the second user interface;

determining, based on at least the monitoring of the plurality of user interfaces, whether the first user interface and the second user interface are candidates for adaptation, wherein the determining comprises:

comparing a first object type associated with the portion of the first user interface with a second object type associated with the portion of the second user interface; and determining, based at least in part on the comparison, whether a match exists between the first object type and the second object type, wherein the first user interface and the second user interface are determined to be candidates for adaptation when a match is determined to exist between the first object type and the second object type; and generating, when the first user interface and the second user interface are determined to be candidates for adaptation, an adapted user interface by at least combining the portion of the first user interface, the portion of the second user interface, and an analysis portion, wherein the analysis portion includes analysis information associated with the action, wherein the analysis information enables a determination of whether to take the action, and wherein the adapted user interface includes the portion of the first user interface, the portion of the second user interface, and the analysis portion.

2. The non-transitory computer-readable medium of claim 1, wherein the notification of the workflow task further includes priority information, a subject, a due date, and an identity of a sender of the notification.

3. The non-transitory computer-readable medium of claim 2 further comprising:

providing, at a user interface, a prompt for a consent to the combining.

4. The non-transitory computer-readable medium of claim 1, wherein the monitoring further comprises:

monitoring an application programming interface at each of the first user interface and the second user interface.

5. The non-transitory computer-readable medium of claim 1 further comprising:

configuring an adaptor, at application server of a multi-tenant system, to perform at least one of the monitoring, the determining, and the generating.

6. The non-transitory computer-readable medium of claim 1, wherein the monitoring further comprises:

monitoring navigation to the analysis information; and determining, based at least in part on navigation to the analysis information, whether to at least combine the analysis portion with the portion of the first user interface and the portion of the second interface.

7. The non-transitory computer-readable medium of claim 6, wherein the analysis information includes utilization information and/or a proposed action.

8. A method comprising:

monitoring a plurality of user interfaces for a process, wherein a first user interface represents a notification of a workflow task to be completed and a second user interface represents information associated with an action corresponding to the notification, and wherein the monitoring includes monitoring at least a navigation between a portion of the first user interface and a portion of the second user interface;

determining, based on at least the monitoring of the plurality of user interfaces, whether the first user interface and the second user interface are candidates for adaptation, wherein the determining comprises:

comparing a first object type associated with the portion of the first user interface with a second object type associated with the portion of the second user interface; and determining, based at least in part on the comparison, whether a match exists between the first object type and the second object type, wherein the first user interface and the second user interface are determined to be candidates for adaptation when a match is determined to exist between the first object type and the second object type; and generating, when the first user interface and the second user interface are determined to be candidates for adaptation, an adapted user interface by at least combining the portion of the first user interface, the portion of the second user interface, and an analysis portion, wherein the analysis portion includes analysis information associated with the action, wherein the analysis information enables a determination of whether to take the action, and wherein the adapted user interface includes the portion of the first user interface, the portion of the second user interface, and the analysis portion.

9. The method of claim 8, wherein the notification of the workflow task further includes priority information, a subject, a due date, and an identity of a sender of the notification.

10. The method of claim 9 further comprising:
providing, at a user interface, a prompt for a consent to the combining.

11. The method of claim 8, wherein the monitoring further comprises:
monitoring an application programming interface at each of the first user interface and the second user interface.

12. The method of claim 8 further comprising:
configuring an adaptor, at application server of a multitenant system, to perform at least one of the monitoring, the determining, and the generating.

13. A system comprising:
at least one processor;
at least one memory including code which when executed by the at least one processor causes operations comprising:
monitoring a plurality of user interfaces for a process, wherein a first user interface represents a notification of a workflow task to be completed and a second user interface represents information associated with an action corresponding to the notification, and wherein the monitoring includes monitoring at least a navigation between a portion of the first user interface and a portion of the second user interface;

determining, based on at least the monitoring of the plurality of user interfaces, whether the first user interface and the second user interface are candidates for adaptation, wherein the determining comprises:

comparing a first object type associated with the portion of the first user interface with a second object type associated with the portion of the second user interface; and determining, based at least in part on the comparison, whether a match exists between the first object type and the second object type, wherein the first user interface and the second user interface are determined to be candidates for adaptation when a match is determined to exist between the first object type and the second object type; and generating, when the first user interface and the second user interface are determined to be candidates for adaptation, an adapted user interface by at least combining the portion of the first user interface, the portion of the second user interface, and an analysis portion, wherein the analysis portion includes analysis information associated with the action, wherein the analysis information enables a determination of whether to take the action, and wherein the adapted user interface includes the portion of the first user interface, the portion of the second user interface, and the analysis portion.

14. The system of claim 13, wherein the notification of the workflow task further includes priority information, a subject, a due date, and an identity of a sender of the notification.

15. The system of claim 14 further comprising:
providing, at a user interface, a prompt for a consent to the combining.

16. The system of claim 13, wherein the monitoring further comprises:
monitoring an application programming interface at each of the first user interface and the second user interface.

* * * * *